UNITED STATES PATENT OFFICE.

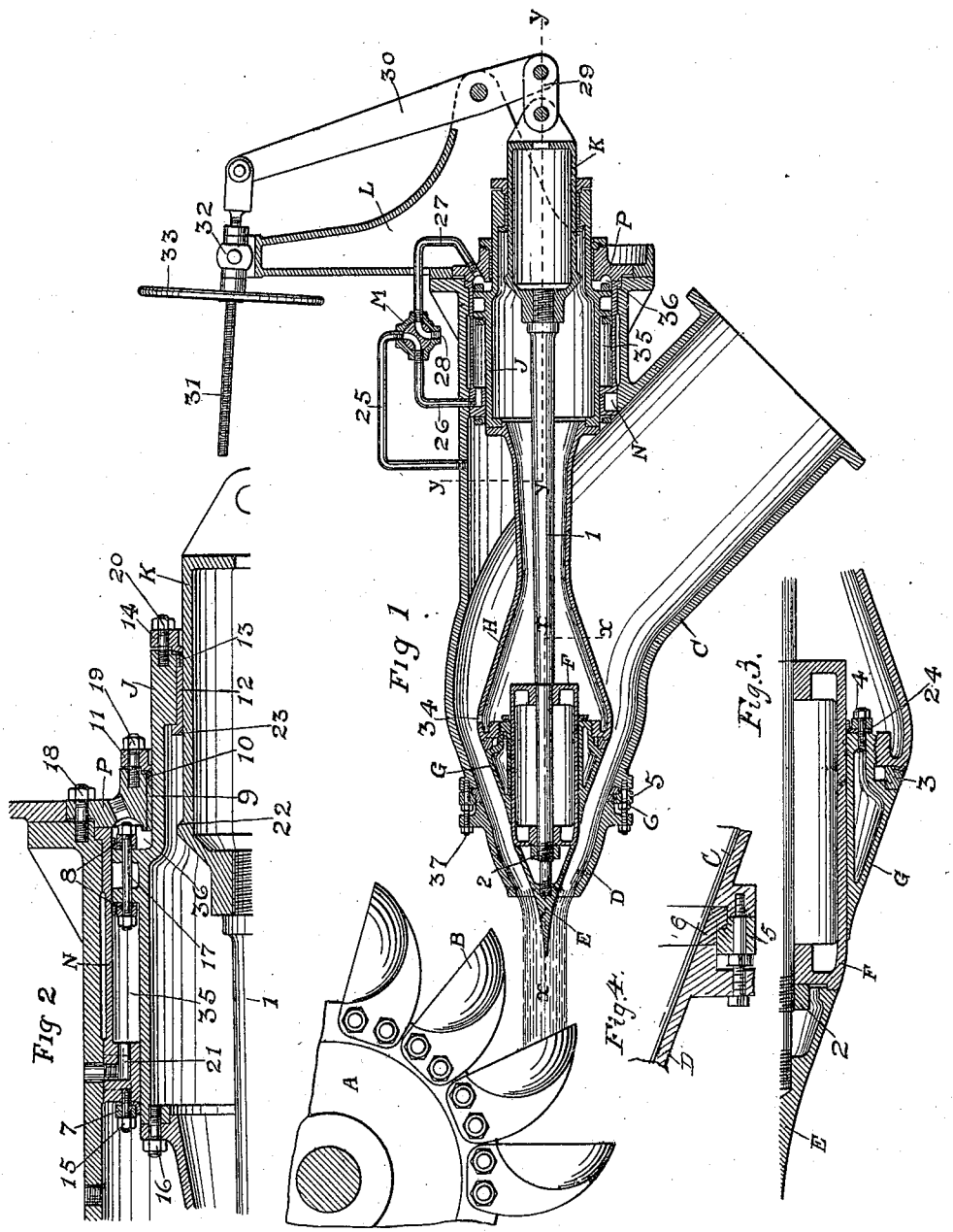

FREDERICK GFELLER, OF OAKLAND, CALIFORNIA.

VALVE FOR WATER-NOZZLES.

975,350.  Specification of Letters Patent.  Patented Nov. 8, 1910.

Application filed October 12, 1909. Serial No. 522,217.

*To all whom it may concern:*

Be it known that I, FREDERICK GFELLER, a citizen of the United States, residing at Oakland, in the county of Alameda and State of California, have invented new and useful Improvements in Valves for Water-Nozzles, of which the following is a specification.

My invention relates to improvements in nozzles which are especially designed for use in connection with tangential water-wheels, turbines, and similar apparatus.

It consists in the combination of parts and details of construction which will be more fully explained by reference to the accompanying drawings, in which—

Figure 1 is a longitudinal section of my apparatus. Fig. 2 is an enlarged section taken through y—y of Fig. 1. Fig. 3 is a detail section on line x—x of Fig. 1. Fig. 4 is an enlarged sectional detail of the seats 5—6.

It is the object of my invention to provide an improved means for controlling the supply of water, under high pressure, to tangential water-wheels or turbines, and to eliminate the expensive and very unsatisfactory disk gate valve, especially where high heads and dirty water prevail.

My invention also protects the valve seats from eddies, and thus reduces the wear and increases the efficiency of the plant by reducing the velocity and frictional loss of the water within the pipe as the adaptation of this gate allows the pipe to remain sufficiently large.

As shown in the drawings, A is the wheel center, with buckets B of any suitable or desired description fastened to the periphery, and C is the water supply pipe.

D is the convergent tip of the pipe or nozzle which is secured to the end of the entrance pipe by studs or bolts as at 37, and the valve seat 6 having the flange 5 is held in place by the same bolts.

E is a removable central needle point which is screwed upon the central stem or shank 1, and the plunger F is secured to the same by the nut 2, said needle point, E, adapted to seat against the convergent tip, D, so as to close the same. The opposite end of the stem or shank 1 carries a plunger K, and this plunger carries a valve 22 which is closable upon a valve seat 23. The stem or shank 1, with the plunger F, the needle point E, and the plunger K, are thus adapted to move in unison, and by the forward movement of these parts, the tapering needle point E may be advanced, and the annular passage around this point and between it and the tip D will be made smaller, and the flow of water correspondingly decreased. The opposite movement of these parts withdraws the tapering point and connected parts, and thus enlarges the passage and the supply of water. These parts can be actuated by means of a lever 30 which is fulcrumed to a fixed yoke or bracket L, and is connected by links 29 to the rear end of the plunger K. The opposite end is connected through a rocking trunnion 32, with a screw 31, and by means of the hand-wheel 33 the parts may be moved to reciprocate the valve stem or shank and needle-point as previously described.

The plunger F is supported and guided by a main valve G, through which it is capable of reciprocation. This valve screws into the shell H, and in so doing locks the annular seat 3.

A leather packing 24 is fixed by studs 4 to the valve G, within which the plunger F is slidable, and this prevents water from leaking through when the valve G is closed, or when the tip D and needle point are being replaced.

The shell H has a hole made in it at 34 to admit water freely to the interior, and to the main plunger J, thus keeping a balance with the exterior water pressure, and of the plungers F and K.

The shell H is fastened to the main plunger or cylinder shell J by studs 16 and this plunger forms, in conjunction with the sleeve N, a pressure cylinder with chambers 35 and 36.

The main plunger J has two leather packings, shown at 8 Fig. 2, secured together by bolts 17.

The pressure chamber 35 is protected from water pressure in the entrance pipe by a leather packing 7 in the case when the pressure of water is admitted to the rear chamber 36, and the closing of the valve is contemplated. A cover P is fastened to the flange of the entrance pipe by studs as shown at 18, and this is also provided with a leather packing 10 which is secured in place by studs 19 and the gland 11, thus making the pressure chamber 36 water-tight.

The object of the valve seat 23, and the bushing 12, and the valve 22 of the plunger K, is to enable the leather packing 13 to be changed while the apparatus is under pressure.

M is a four-way cock.

25 is a pipe connecting with the interior of the water supply pipe, and 26 is another pipe leading from the cock to the chamber 35, while the chamber 36 is connected with the cock by a pipe 27.

28 is an exhaust or discharge passage from the cock.

The position of the parts as here shown is the position during the open position of the gate G. If the gate G is to be closed, the four-way cock will be turned to connect the pressure chamber 36 with the pressure pipe 25, and the exhaust or discharge passage 28 with the pipe 26, thus effecting a simultaneous movement of main plunger J with shell H, circular valve G and annular ring 3, in the direction of the flowing water until ring 3 reaches valve seat 6, or the closed position of the gate.

Having thus described my invention, what I claim and desire to secure by Letters Patent is—

1. The combination in a pressure discharge nozzle, of a convergent exterior shell and tip, an interior shell having its outer portion concentric with and approximating the shape of the outer end of the exterior shell, and having a cylindrical central opening, a pair of connected plungers fitting and reciprocal in the interior shell, and a convergent needle carried by the plunger and extending into the nozzle tip.

2. The combination in a pressure discharge nozzle, of a convergent exterior shell and tip, an interior shell having an outer portion concentric with the discharge of the exterior shell, a pair of connected alined plungers fitting the inner shell, a removable tapering needle carried with the plungers, and forming a substantial continuation of the interior shell, and means by which the plungers and needle may be advanced or retracted.

3. The combination in a pressure discharge nozzle, of exterior and interior shells, cylinders at the front and rear of the inner shell, axially alined plungers fitting said shells and having a connecting stem, a convergent needle carried by the forward plunger, and capable of varying the nozzle opening, a valve carried by the rear plunger, and a seat against which the valve closes.

4. The combination in a pressure discharge nozzle, of exterior and interior shells between which water is admitted, cylinders at the front and rear of the inner shell, plungers fitting said shells and having a connecting stem, a convergent needle carried by the forward plunger and movable therewith to vary the nozzle opening, mechanism by which said parts may be advanced or retracted, and means to admit water under its normal pressure to the inner shell to balance the plungers.

5. The combination in a pressure discharge nozzle, of an outer pipe and tip, an interior shell, said pipe and shell having concentric outer ends, a controlling valve having a convergent end, a cylinder, a plunger movable therein with which the shell is connected, a second plunger, connected to said valve, and means to admit fluid under pressure to reciprocate the first named plunger.

6. The combination in a pressure discharge nozzle, of an outer pipe and discharge tip, an interior shell, a valve carried thereby, a cylinder and plunger axially in the rear, with which plunger the shell is connected, means to admit a fluid to advance or retract the plunger and valve, a second plunger movable in the front of the shell, a tip carried by said plunger, forming a continuation of the valve, and a third plunger connected with the second named, and means to advance or retract said second and third plungers and valve tip independently of the movements of the valve and shell.

7. A hydraulic nozzle comprising a discharge tip and a compound valve therein, said valve including an independently movable needle and independently movable head surrounding the needle, and each adapted to independently control the discharge of fluid through the nozzle.

8. A hydraulic nozzle comprising a discharge tip and a plurality of independently reciprocable valves within said nozzle controlling the discharge through the nozzle tip, and both adapted to seat independently against the nozzle to close the discharge thereof.

In testimony whereof I have hereunto set my hand in the presence of two subscribing witnesses.

FREDERICK GFELLER.

Witnesses:
 CHARLES A. PENFIELD,
 CHARLES EDELMAN.